United States Patent
Boscolo Berto (10) Patent No.: US 12,334,119 B2
(45) Date of Patent: Jun. 17, 2025

(54) METHOD OF OPERATING HARD DISK DRIVES, CORRESPONDING CONTROL CIRCUIT, HARD DISK DRIVE AND PROCESSING DEVICE

(71) Applicant: STMicroelectronics International N.V., Geneva (CH)

(72) Inventor: Michele Boscolo Berto, Milan (IT)

(73) Assignee: STMicroelectronics International N.V., Geneva (CH)

( * ) Notice: Subject to any disclaimer, the term of this patent is extended or adjusted under 35 U.S.C. 154(b) by 0 days.

(21) Appl. No.: 18/678,645

(22) Filed: May 30, 2024

(65) Prior Publication Data

US 2024/0420737 A1    Dec. 19, 2024

(30) Foreign Application Priority Data

Jun. 19, 2023    (IT) .......................... 102023000012570

(51) Int. Cl.
*G11B 27/36*    (2006.01)
*H02P 7/025*    (2016.01)

(52) U.S. Cl.
CPC .............. *G11B 27/36* (2013.01); *H02P 7/025* (2016.02)

(58) Field of Classification Search
None
See application file for complete search history.

(56) References Cited

U.S. PATENT DOCUMENTS

| | | | |
|---|---|---|---|
| 6,631,045 B1 * | 10/2003 | Pedrazzini | G11B 21/22 |
| 6,754,031 B1 * | 6/2004 | Kisaka | G11B 5/5526 |
| | | | 360/77.02 |
| 7,215,094 B2 | 5/2007 | Maiocchi et al. | |
| 7,486,039 B2 | 2/2009 | Berto | |
| 8,941,939 B1 * | 1/2015 | Rigney | G11B 5/59661 |
| | | | 360/78.01 |
| 9,947,350 B1 | 4/2018 | Boscolo Berto et al. | |
| 2002/0141098 A1 | 10/2002 | Schlager | |
| 2004/0160695 A1 * | 8/2004 | Zayas | G11B 5/5521 |
| | | | 360/75 |
| 2005/0111133 A1 * | 5/2005 | Sakamoto | G11B 5/54 |
| 2005/0168862 A1 * | 8/2005 | Jeong | G11B 5/5534 |
| | | | 360/75 |
| 2006/0066980 A1 | 3/2006 | Brenden et al. | |
| 2007/0258163 A1 * | 11/2007 | Yoneda | G11B 21/12 |

(Continued)

FOREIGN PATENT DOCUMENTS

EP    1118994 A2    7/2001

*Primary Examiner* — Peter Vincent Agustin
(74) *Attorney, Agent, or Firm* — Slater Matsil, LLP (57) ABSTRACT

A voice coil motor (VCM) in a hard disk drive is operated in a discontinuous mode with an alternation of on and off times. A drive current to the VCM is facilitated and countered with a variable voltage across the during the on-times and off-times. The intensity of the drive current is controlled as a function of a Back ElectroMotive Force (BEMF) of the VCM. A method includes sampling during the alternation of on-times and off-times first and second values of the voltage across the VCM. The first value is sampled at a first time in response to the end of the off-time. The second value is sampled at a second time in response to the drive current of the VCM zeroing following the supply of drive current to the VCM being countered during the off-time. The BEMF is calculated as a function of first and second values.

20 Claims, 10 Drawing Sheets

(56) References Cited

U.S. PATENT DOCUMENTS

| | | | |
|---|---|---|---|
| 2010/0067140 A1* | 3/2010 | Yamashita | G11B 21/12 360/75 |
| 2023/0317107 A1* | 10/2023 | Guo | G11B 5/5573 360/75 |
| 2024/0420737 A1* | 12/2024 | Boscolo Berto | G11B 5/5526 |

* cited by examiner

METHOD OF OPERATING HARD DISK DRIVES, CORRESPONDING CONTROL CIRCUIT, HARD DISK DRIVE AND PROCESSING DEVICE

CROSS-REFERENCE TO RELATED APPLICATIONS

This application claims the benefit of Italian Application No. 102023000012570, filed on Jun. 19, 2023, which application is hereby incorporated by reference herein in its entirety.

TECHNICAL FIELD

The description relates to hard disk drives (HDDs). One or more embodiments can be applied, for instance, to hard disk drives used in processing devices such as computers, servers, data centers, and the like.

BACKGROUND

Hard disk drives (HDDs) employ a spindle motor to rotate one or more disks and voice coil motors (VCMs) to move the heads with respect to the disk(s). That is, the spindle motor spins the hard disk(s) on which data are stored, and the VCM motor or motors position the read/write heads on the surface of the hard disk(s).

Hard disk drives thus include at least two motors (spindle and VCM) that are driven by power semiconductor devices (integrated circuits), usually referred to as power combos. Driving a VCM in an HDD environment in a discontinuous mode facilitates extrapolating the speed of the VCM in conditions where more complex techniques, possibly involving adequate calibrations are not feasible.

During discontinuous driving, the current in the load, a VCM, is interrupted (discontinued) for a fixed time ($T_{OFF}$ times) at regular intervals to facilitate measuring the Back ElectroMotive Force, BEMF directly across the load.

It is noted that the voltage across the load has a component that is not representative of motor speed (the BEMF) and is related to other phenomena produced by the sudden current interruption. This undesired, disrupting component (commonly referred to as "residual voltage") disappears over time. However, residual voltage limits the possibility of using relatively short Torr times in cases where an accurate measurement of VCM motor speed is desirable.

SUMMARY

An object of one or more embodiments is to contribute to facilitating such accurate measurement.

According to one or more embodiments, that object is achieved with a method as set forth in the following claims.

One or more embodiments relate to a corresponding controller circuit.

One or more embodiments relate to a corresponding hard disk drive.

One or more embodiments relate to a corresponding processing device. A computer, a server, or a data center equipped with a hard disk drive is exemplary of such a device.

The claims are an integral part of the technical teaching on the embodiments as provided herein.

One or more embodiments provide a technique for linearization and compensation of the residual voltage across a VCM motor winding during discontinuous driving.

One or more embodiments facilitate reducing the intervals $T_{OFF}$ over which current is interrupted during discontinuous driving of a load such as a VCM motor without compromising the accuracy of measuring BEMF and, consequently, motor speed.

One or more embodiments facilitate the linearization of residual voltage that may be present across a VCM motor driven in discontinuous mode based on at least two measurements of the motor's voltage carried out at different times.

In one or more embodiments, at least one voltage can be measured after a constant time calculated starting from the beginning of an "off" phase of the discontinuous driving mode.

In one or more embodiments, at least one voltage can be measured after a constant time calculated starting from the discontinuous driving current being annulled.

In one or more embodiments, residual voltage linearization can take place thanks to the generation of a signal obtained from a mathematical average of the voltages measured in at least two different time instants.

BRIEF DESCRIPTION OF THE DRAWINGS

One or more embodiments will now be described, by way of example only, with reference to the annexed figures, wherein:

FIGS. 3A to 3D and 4A to 4D are time diagrams in support of the present disclosure where FIGS. 3A, 3B, plus

Corresponding numerals and symbols in the figures generally refer to corresponding parts unless otherwise indicated. The figures are drawn to clearly illustrate the relevant aspects of the embodiments and are not necessarily drawn to scale. The edges of features drawn in the figures do not necessarily indicate the termination or the extent of the feature. Also, for the sake of simplicity and ease of explanation, a same designation may be applied throughout this description to designate a circuit node or line as well as a signal occurring at that node or line.

Figure 2A:
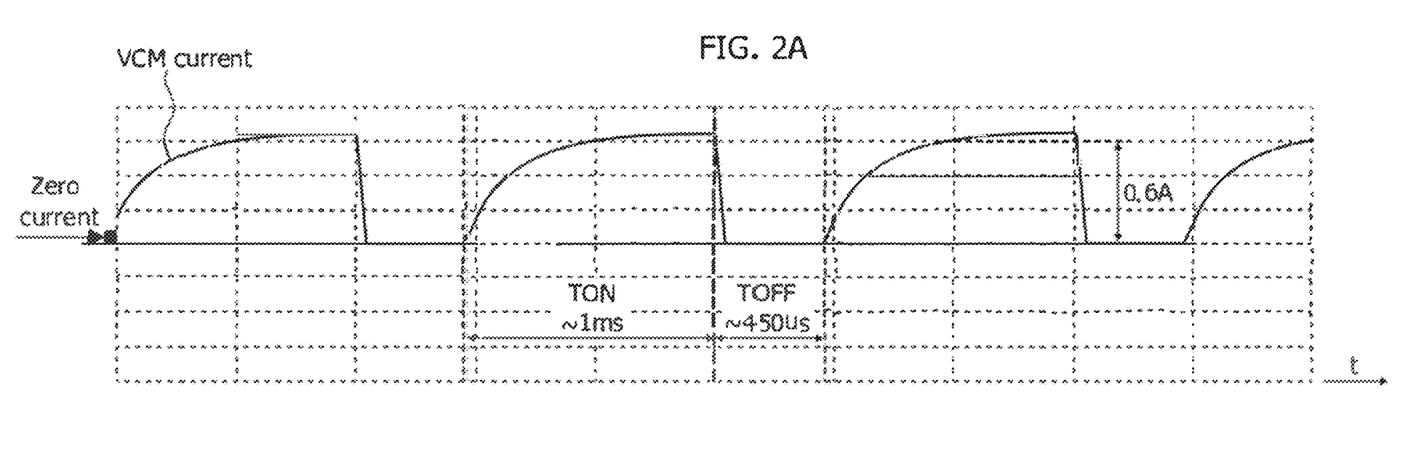
FIGS. 2A and 2B are time diagrams showing possible time behaviors of current (FIG. 2A) and voltage (FIG. 2B) in a VCM motor driven in a discontinuous mode, with the VCM motor stopped (BEMF=0)
Figure 2B:
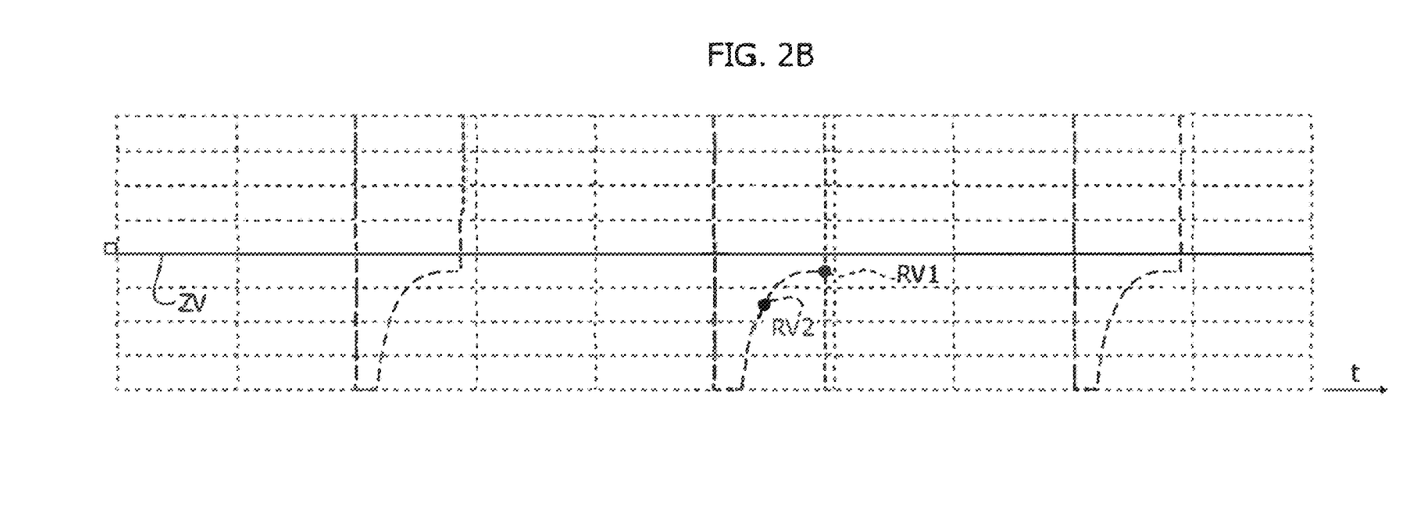

The quantitative values indicated the diagrams of FIGS. 2A, 2B; FIGS. 3A, 3B, 3C, 3D; FIGS. 4A, 4B, 4C, 4D; and FIGS. 5A, 5B are merely exemplary and non-limiting.

DETAILED DESCRIPTION OF ILLUSTRATIVE EMBODIMENTS

In the ensuing description, various specific details are illustrated to provide an in-depth understanding of various examples of embodiments according to the description. The embodiments may be obtained without one or more of the specific details, or with other methods, components, materials, etc. In other cases, known structures, materials, or operations are not illustrated or described in detail so that various aspects of the embodiments will not be obscured.

Reference to "an embodiment" or "one embodiment" in the framework of the present description is intended to indicate that a particular configuration, structure, or characteristic described in relation to the embodiment is comprised of at least one embodiment. Hence, phrases such as "in an embodiment," "in one embodiment," or the like, that may be present in various points of the present description do not necessarily refer exactly to the same embodiment. Furthermore, particular configurations, structures, or characteristics may be combined in any adequate way in one or more embodiments.

The headings/references used herein are provided merely for convenience and, hence, do not define the extent of protection or the scope of the embodiments.

As discussed in the introductory portion of this description, HDD is a shortened designation for Hard Disk Drive. A hard disk drive is a component of various types of processing devices such as personal computers, servers, data centers, or the like. It is the physical location where information is stored.

Hard disk drives (HDDs) employ a spindle motor to rotate one or more disks and one or more voice coil motors or VCMs to move the heads with respect to the disk(s). That is, the spindle motor is used to spin the hard disk(s) on which data are stored, and the VCM motor or motors are used to position the read/write heads on the surface of the hard disk(s).

Hard disk drives thus include at least two motors (spindle and VCM) that are driven by power semiconductor devices (integrated circuits), usually referred to as power combos.

In current HDDs, a ramp is provided at the outer side of the disk (outer disk, OD); that ramp is used to position the heads when they are not in use (that is, when the heads are in the parked position).

The procedure implemented to move the heads from a parked position to an operating position on the disk surface is referred to as "VCM load"; the reverse procedure, that is, moving the heads from the disk surface to a parked position, is referred to as "VCM unload" or "VCM retract."

Performing the load and unload procedures at a controlled speed facilitates avoiding damage to the heads or to the surface of the disk (disk scratch).

Figure 1:
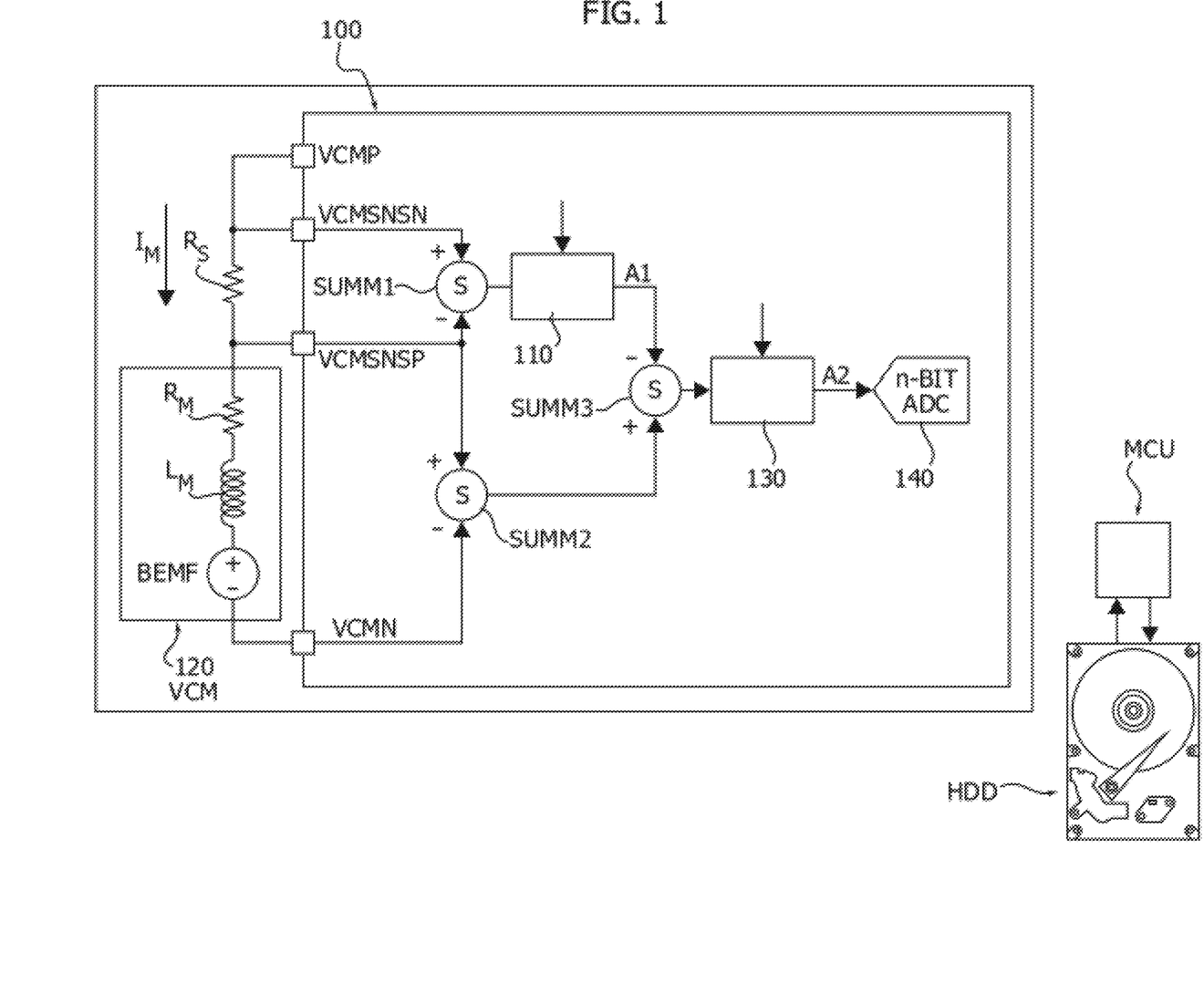
FIG. 1 is a block diagram of a circuit used for Back ElectroMotive Force, BEMF reconstruction during driving of a Voice Coil Motor, VCM in a continuous mode.

As represented in FIG. 1, in HDD applications, a servo controller MCU can be provided to adjust the VCM drive current as desired, for instance, to keep the heads on track and/or to facilitate adequately performing "VCM load" and "VCM unload"/"VCM retract" procedures. This may occur via a (speed) control word provided by the controller MCU.

A feedback signal can be used to control the speed of the VCM. The voltage (Back ElectroMotive Force or BEMF) generated by the VCM motor during movement can be used for that purpose as the BEMF is (directly) proportional to the speed of the VCM.

The general principle underlying the operation of a VCM in an HDD is conventional in the art, so it is unnecessary to provide a more detailed description herein. Also, it will be appreciated that embodiments of the present description are primarily concerned with adequately evaluating (measuring) the BEMF of a VCM rather than with the solutions that may be adopted—in various ways known to those of skill in the art—for controlling a VCM based on such an adequate evaluation/measurement of the BEMF.

FIG. 1 is a block diagram of a circuit that can be used for Back ElectroMotive Force, BEMF reconstruction during driving of a Voice Coil Motor (VCM) designated with reference 120 and represented as a (voltage) source of Back ElectroMotive Force, BEMF with an associated (series) inductance $L_M$ and resistance $R_M$.

A BEMF reconstruction circuit 100, as illustrated in FIG. 1, comprises input nodes VCMSNSP and VCMN coupled across the VCM 120, plus at least one further input node VCMSNSN with a resistor $R_S$ coupled between the nodes VCMSNSN and VCMSNSP. The voltage across the resistor $R_S$ (the voltage drop between the nodes VCMSNSN and VCMSNSP) is a measure of a current $I_M$ that flows towards the VCM 120 starting from a supply node VCMP.

A first summation node SUMM1 (with sign) produces a signal based on the difference between the voltages at the nodes VCMSNSN and VCMSNSP, which is thus a measure of a current $I_M$ and is amplified via a first gain stage 110 to produce a signal A1.

A second summation node SUMM2 (with sign) produces a signal based on the difference between the voltages at the nodes VCMSNSP and VCMN, which is thus a measure of the voltage drop across the VCM 120.

A third summation node SUMM3 (with sign) produces a signal based on the difference between the voltage at the output of the second summation node SUMM2 and the voltage A1. The difference signal thus obtained is amplified via a second gain stage 130 to produce a signal A2 that can be converted to digital via an analog-to-digital converter 140.

The arrangement illustrated in FIG. 1 is otherwise conventional in the art, making a more detailed description unnecessary.

It is otherwise noted (this also applies to the description provided in connection with the further figures) that the VCM 120 per se may not be a part of the circuit for BEMF reconstruction as supplied. That circuit and the VCM can be connected only by the end user.

Essentially, two approaches can be adopted to measure the BEMF of a VCM. One approach involves the analog reconstruction of the BEMF voltage based on the characteristics of the motor (resistance $R_M$) and the current sensing circuit (resistance $R_S$), as shown in FIG. 1.

Another approach involves measuring the BEMF present at (across) the motor terminals after interrupting the circulation of current for a brief instant.

The former method is used during continuous driving, with the motor's current never interrupted and supplied continuously.

The latter method is used during discontinuous driving, with the current in the motor interrupted at regular intervals to facilitate reading the BEMF voltage directly across the VCM.

While usually preferred over a discontinuous mode, controlling the VCM speed in a continuous mode cannot be resorted to in certain circumstances in so far as it relies on accurate calibration over a non-negligible time duration, which can only be carried out in particular conditions.

BEMF reconstruction during continuous driving relies upon calibration with results that are a function of the motor resistance $R_M$ (see FIG. 1).

The motor resistance $R_M$ is not constant but varies with temperature. Because of this dependence on temperature, it is possible to use effectively such a "BEMF monitor" only if calibrated in the instants immediately preceding its use.

This is feasible with load and unload phases controlled under normal operating conditions but is not satisfactory when the heads are parked in response to a critical emergency event (for example, loss of the power source). In that case, the parking phase (referred to as emergency retract) should desirably be carried out immediately and without latencies that may result from a possible calibration phase.

In an emergency retract, discontinuous driving can be used instead, as this facilitates measuring the BEMF of the VCM motor directly at the motor terminals, without any calibration involved.

Discontinuous driving has some unwanted side effects related to the possible onset of a disturbance voltage across the load—here represented by the VCM motor—in response to the driving current being (abruptly) interrupted. This voltage, usually referred to as "residual voltage," lies at the basis of various problems which will be described later on.

The residual voltage becomes naturally depleted over time and the unwanted effects related therewith can be countered by measuring the BEMF of a VCM at the end of the current turn-off time ($T_{OFF}$ time) using relatively long $T_{OFF}$ times.

In turn, using relatively long $T_{OFF}$ times has consequences from the viewpoint of VCM control, such as a higher speed ripple and a lower maximum driving torque generated by the motor.

Attempts to reduce $T_{OFF}$ to limit such undesired effects (speed ripple and reduced maximum driving torque) lead to other undesired effects, such as an incorrect estimate of the real speed of the VCM: the estimate is distorted by the presence of the residual voltage, whose size is no longer negligible.

A possible solution to the residual voltage problem would involve compensating the residual voltage, but the intrinsically non-linear nature of residual voltage makes this option difficult to implement.

Embodiments, as described herein, involve an effective "linearization" of residual voltage, which makes compensation simple and economical.

Embodiments described herein facilitate reducing $T_{OFF}$ times compared with the prior art without penalizing the estimation of the VCM motor's actual speed. An accurate estimate of VCM speed can be provided with an improvement in respect of speed ripple and the maximum driving torque generated by the VCM.

Embodiments, as described herein, thus address the problem related to the minimum duration of the $T_{OFF}$ being limited by the residual voltage present across a VCM driven discontinuously.

It is noted that residual voltage is a disturbing factor that, for the same value for TOFF, is proportional to the intensity of the current forced into the motor during the conduction phases (TON times) in discontinuous driving. However, the function linking the current amplitude during the TON times to the residual voltage amplitude during the TOFF times is non-linear and, therefore, cannot be compensated in a simple way.

Embodiments, as described herein, thus involve a "linearization" of the residual voltage that facilitates simple and effective compensation (cancellation).

Figure 3B:
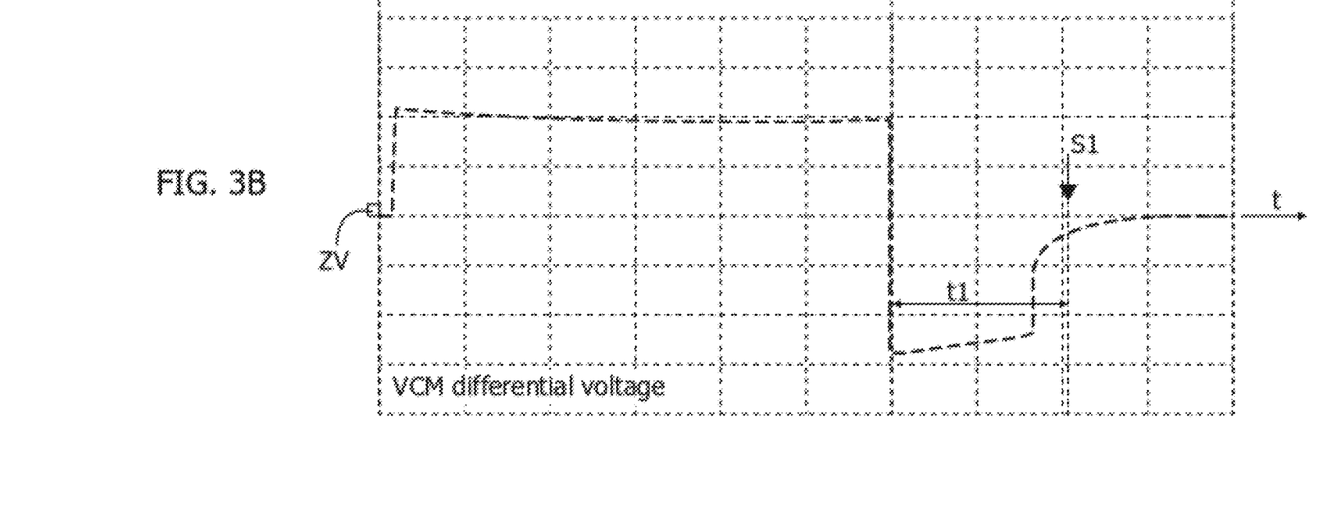
Figure 4A:
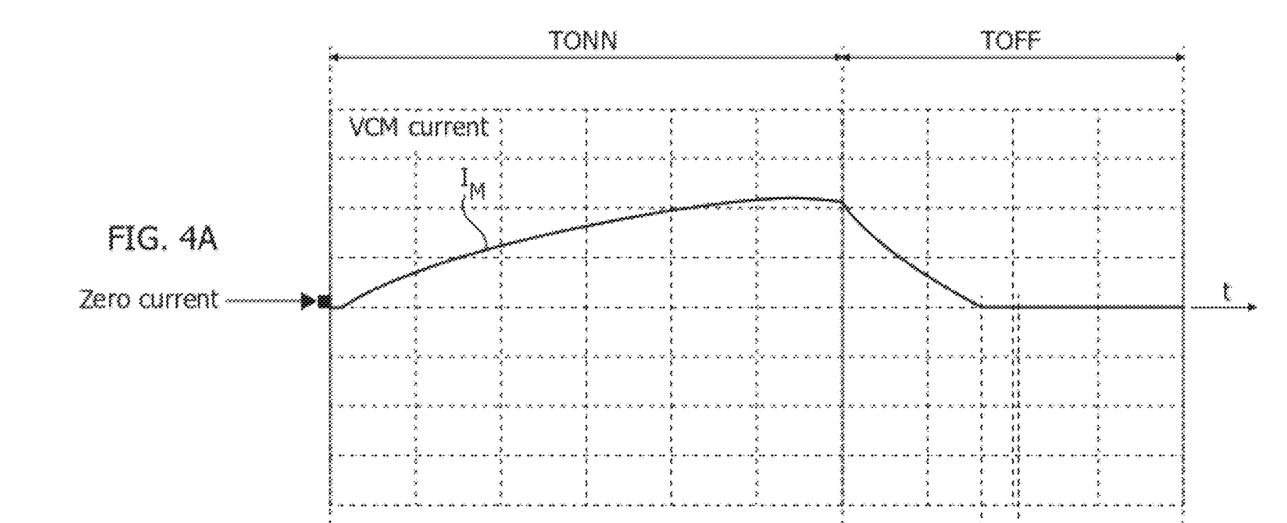
FIGS. 4A, 4B, are time diagrams showing possible time behaviors of electrical signals (current pulse and voltage pulse applied during discontinuous driving) during dynamic tests where residual voltages are sampled at different instants (S1 and S2) corresponding to different times (t1 and t2)
Figure 4B:
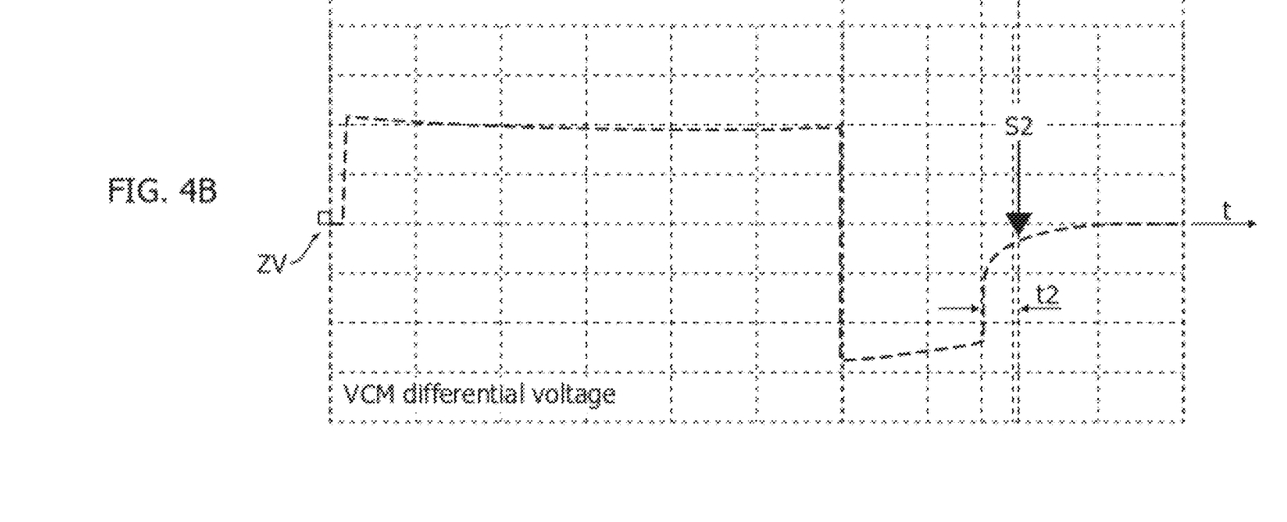
Figure 5A:
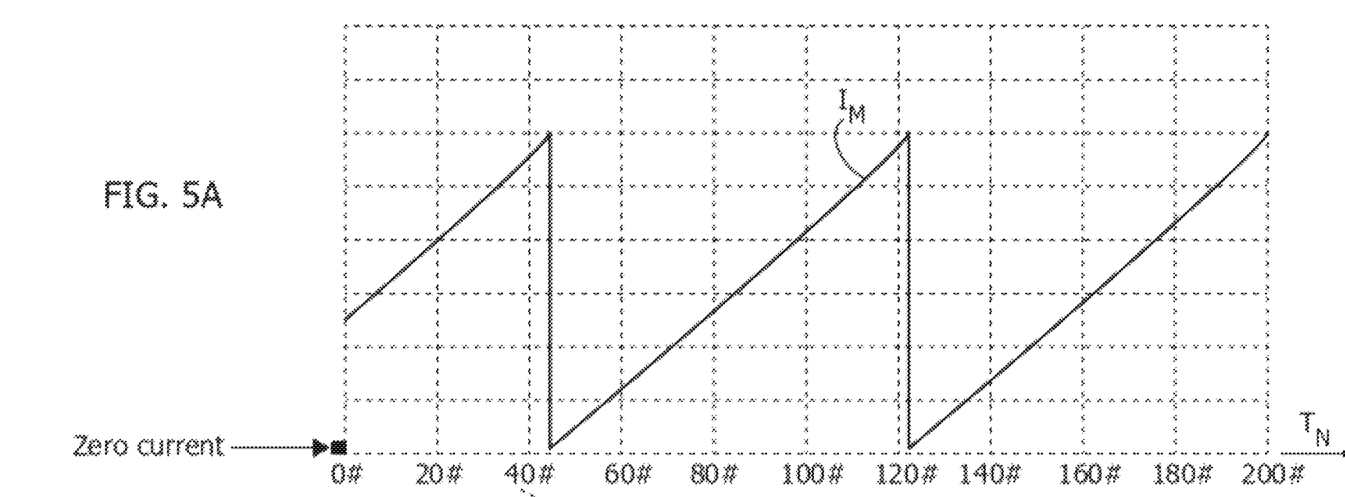
FIGS. 5A and 5B show possible time behaviors of signals produced in applying residual voltage linearization according to embodiments of the present description.
Figure 5B:
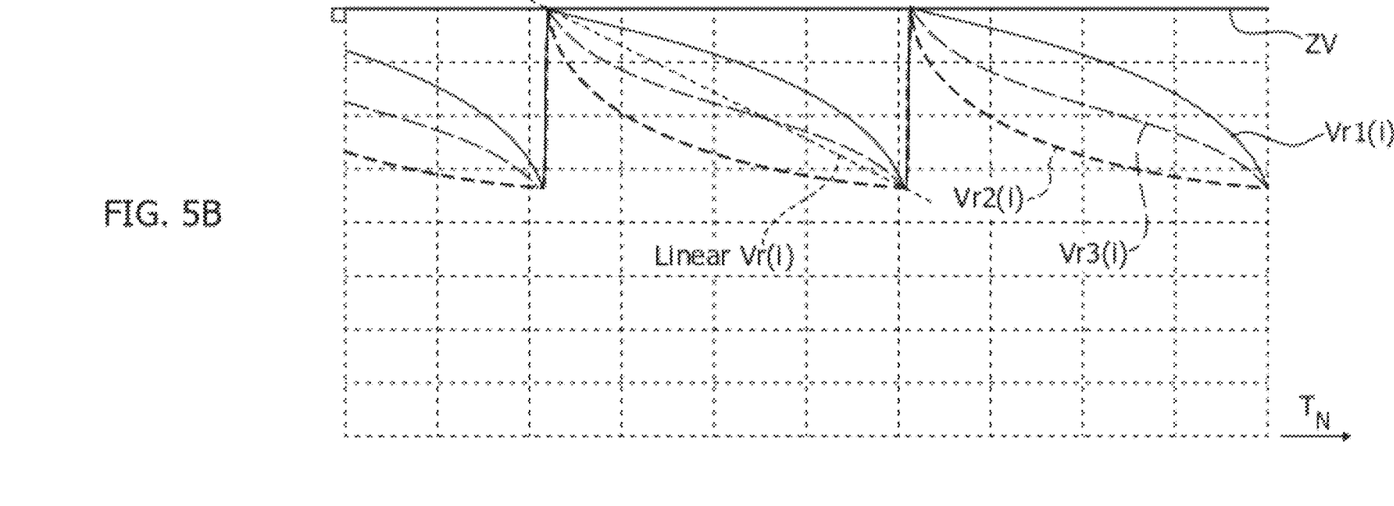

Linearization of the residual voltage can be achieved by combining two residual voltages measured at different instants, namely a first measurement (sampling S1 as exemplified in FIG. 3B) of the residual voltage at the end of the $T_{OFF}$ time, thus after a constant time measured starting from the beginning of the $T_{OFF}$ time (as already experimented in the prior art); and a second measurement (sampling S2 as exemplified in FIG. 4B of the residual voltage after a certain time has elapsed starting from the end of current recirculation or flyback (that is, starting from the time current is canceled).

This approach facilitates linearizing the residual voltage.

Both residual voltages measured at the instants referred to above exhibit a non-linear relationship with respect to the driving current, according to different and complementary functional relationships.

It is noted that combining the two voltages measured in the points described above facilitates obtaining a third voltage which turns out to be an (at least approximately) linear function of the amplitude (intensity) of the current driven in the VCM during the conduction phase ($T_{ON}$ times).

Such "linearization" facilitates compensating (canceling) the effects of residual voltage during sampling of the voltage across the VCM driven in a discontinuous mode. This facilitates (while preserving the same accuracy of the speed estimate) using during discontinuous driving current interruptions ($T_{OFF}$ times) that are significantly shorter than those involved in prior art methods.

As discussed previously, situations may arise (emergency retract, for instance) where VCM retract should desirably be performed in a discontinuous mode using current interruption times $T_{OFF}$ that are as short as possible in order to limit undesired effects typical of discontinuous control, such as speed ripple and reduction of the maximum torque.

Reducing the maximum torque is particularly problematic if a VCM is desired to be slowed down even before it is parked.

This may be the case of an emergency triggered in connection with a "fast seek" phase where the VCM is driven at a (very) high speed to move the HDD heads toward the inside of the disc (ID) or toward the outside of the disc (OD). In the case of an emergency condition occurring during a "fast seek" phase, the VCM should desirably be slowed down vigorously in advance to avoid a possible collision with the ramp (or with a limit switch) at a (too) high speed which could damage the mechanics of the VCM itself.

Conventional methods based on measuring the BEMF during discontinuous driving rely on a single BEMF measurement carried out at the end of the $T_{OFF}$ times in discontinuous driving. The shortest (minimum) duration of $T_{OFF}$ is, in turn, limited by the presence of a voltage (residual voltage), which requires a long time to decay.

This is exemplified in FIGS. 2A and 2B. FIGS. 2A and 2B are time diagrams showing possible time behaviors of VCM current signals (FIG. 2A) and corresponding VCM voltage signals (FIG. 2B) in a VCM motor driven in a discontinuous mode, with the VCM motor stopped (BEMF=0).

It is again noted that the quantitative values indicated the diagrams of FIGS. 2A, 2B (just like the quantitative values indicated the diagrams of FIGS. 3A, 3B, 3C, 3D; FIGS. 4A, 4B, 4C, 4D; and FIGS. 5A, 5B) are merely exemplary and non-limiting.

Typical values of $T_{OFF}$ that facilitate achieving an "acceptable" precision in measuring the speed of the VCM can be on the order of magnitude of several hundreds of microseconds, which greatly influences control performance (in terms of speed ripple and maximum torque, for instance).

FIGS. 2A and 2B show the time diagram of the current (FIG. 2A) and the voltage across the VCM motor (FIG. 2B) driven in a discontinuous mode. The figures refer to a VCM motor that is stopped, therefore with BEMF=0. Since the motor is stopped, the voltage measured across the windings includes only the residual voltage (BEMF=0), which is far from negligible if—as assumed in FIGS. 2A and 2B—the times $T_{ON}$ and $T_{OFF}$ and the (peak) currents shown (with the VCM voltage going out of scale) are consistent with those actually used in field applications.

FIG. 2B shows the residual voltage present across the VCM motor by distinguishing the residual voltage RV1 at the end of $T_{OFF}$, which has a length of 450 microseconds, from the residual voltage RV2 that (would be) present assuming the use of a $T_{OFF}$ of shorter duration. In FIG. 2B, a zero voltage is indicated as ZV.

One can appreciate that the error in the estimate of VCM motor speed increases steeply if $T_{OFF}$ is attempted to be decreased. As noted, the VCM speed during a retract phase should be desirably low in order to avoid damage to the mechanics due to a collision with the ramp.

One may otherwise note that the BEMF generated at these speeds is not much higher than the residual voltage if measured with a $T_{OFF}$ of reduced duration.

Compensation of the residual voltage, which facilitates using decreased $T_{OFF}$ times without penalizing the estimate of the VCM speed, is thus a goal to pursue, especially in cases where high driving torque is desirable, for instance, when the VCM is braked (slowed down) even before parking.

FIGS. 3A to 3D provide a deeper insight into the residual voltage and its non-linear characteristics, which underlie the embodiments described herein.

Figure 3A:
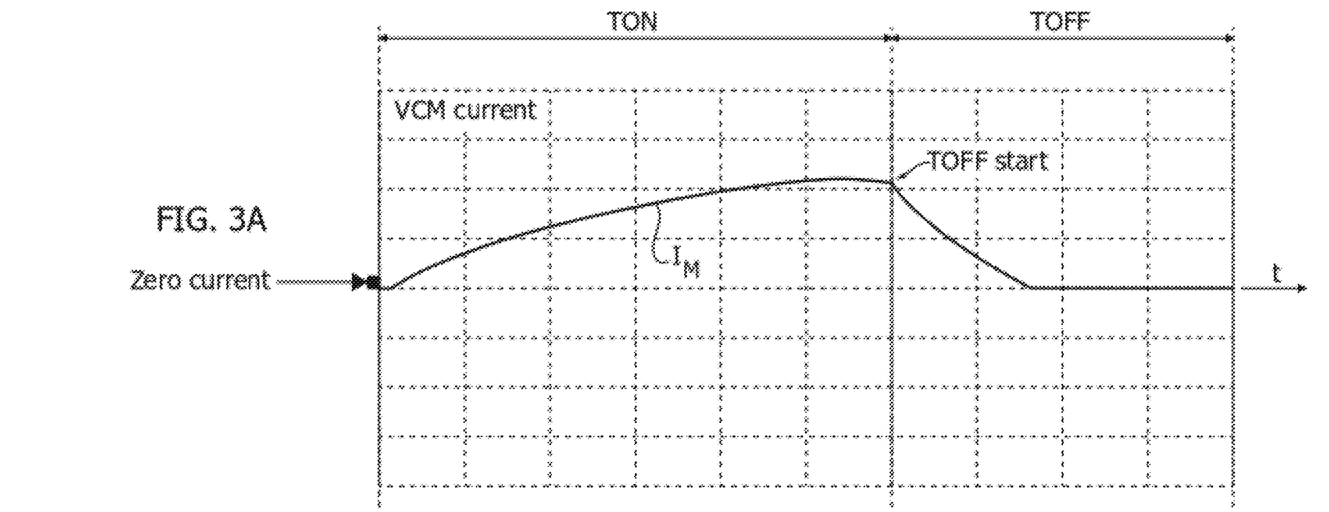
Figure 3C:
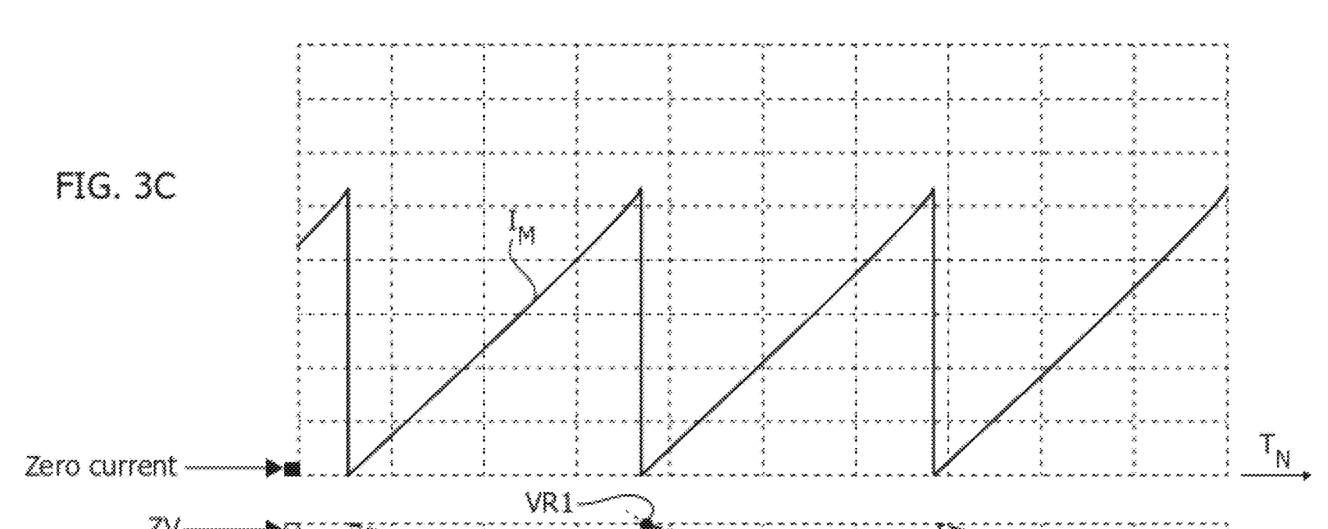
FIGS. 3C and 4C thus show the values of the current amplitude used to plot the residual voltage signal shown in FIGS. 3D and 4D.
Figure 3D:
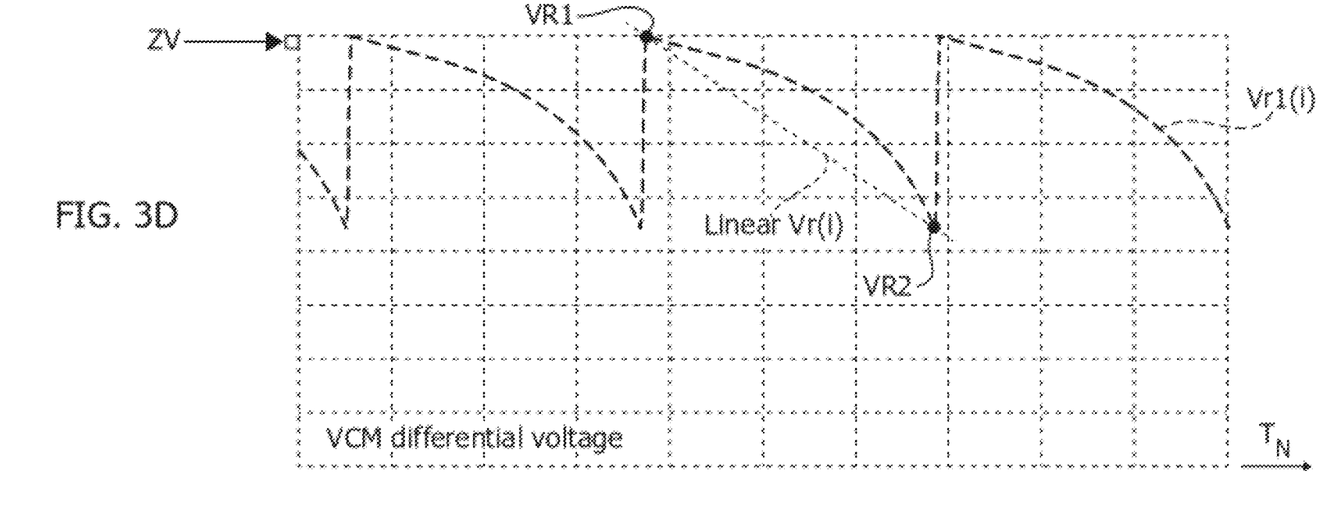
FIGS. 3D and 4D show residual voltages measured at different current amplitudes (as reported on FIGS. 3C and 4C) across the VCM terminals when the voltage is sampled at the instants S1 and S2.

Specifically, FIGS. 3A, 3B, and 3D show possible time behaviors of electrical signals during a dynamic test (in a VCM motor again stopped) where the residual voltage is measured after a constant time t1 starting from the beginning of the $T_{OFF}$ interval (as discussed previously and as otherwise conventional in the art) for different values of the VCM current (as represented in FIG. 3C).

Specifically, FIG. 3A shows the current $I_M$ in the VCM motor during the $T_{ON}$ and $T_{OFF}$ phases; as already mentioned, the test is performed at different current values, and FIG. 3A represents a single snapshot captured during the test; FIG. 3B shows the (differential) voltage across the VCM motor during the $T_{ON}$ and $T_{OFF}$ phases; also, FIG. 3B represents a single snapshot captured during the test, and reference ZV therein again indicates a zero voltage; FIG. 3C shows the trend of the current $I_M$ (reproduced on an enlarged scale for clarity) during a test performed with variable current amplitudes (of increasing values); the figure represents the "trend" of the peak current (over the $T_{ON}$ interval) during the entire test, where the abscissa scale indicates the number NT of different values of the VCM current applied); and FIG. 3D shows the trend of the residual voltage (Vr1($i$)) measured as in conventional methods, namely after a constant time (t1, equal to 100 microseconds, for instance) from $T_{OFF}$ start, that is, calculated starting from the beginning of the interval $T_{OFF}$. The figure shows the trend of the residual voltage, namely the value for each current value. FIG. 3D shows residual voltage values VR1 and VR2 corresponding to a minimum (valley current) and to maximum current (peak current) Vr1(imax), respectively. FIG. 3D also shows in a dotted line (Linear Vr(i)) an ideal (desired) linear characteristic of the residual voltage drawn between the points VR1 and VR2, which can be obtained, with good approximation, and used for compensation via a simple mathematical calculation, as discussed in the following.

Embodiments as discussed herein can thus address the problem of non-linearity of the residual voltage with a second voltage measurement that is not referred to the starting point of the $T_{OFF}$ interval but rather referred to a current zero point (or zero current point).

FIGS. 4A to 4D represent (in a manner substantially corresponding to FIGS. 3A to 3D) possible time behaviors of entities of interest during a dynamic test in which the residual voltage is measured after a constant time t2 calculated starting from a current zero point and for different current values forced during the $T_{ON}$ interval.

This is in contrast with FIGS. 3A to 3D, that are exemplary of measuring the residual voltage after a constant time (t1) starting from the beginning of the $T_{OFF}$ interval.

Figures 4C, 4D:
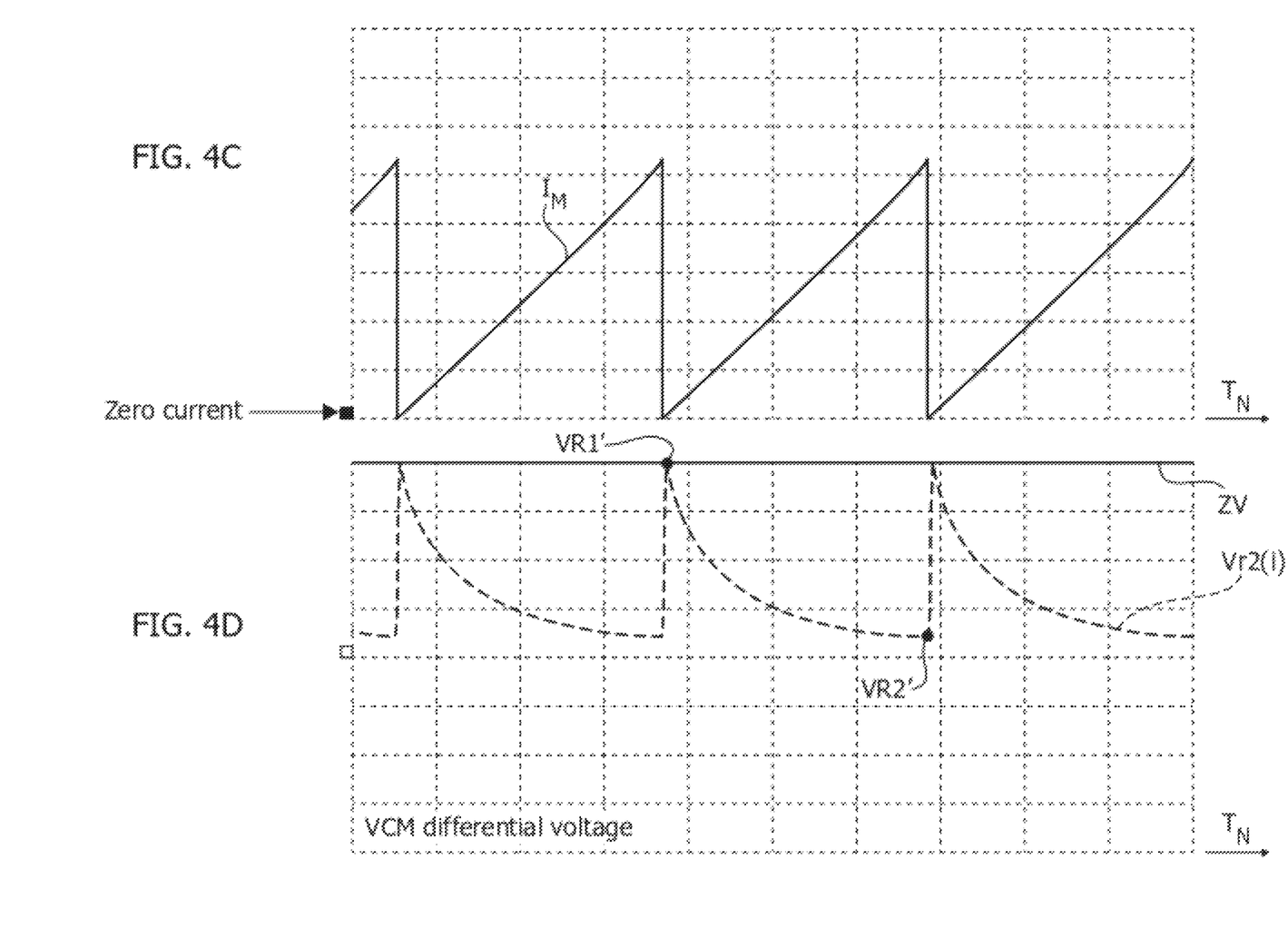

Specifically, FIG. 4A shows the current in the VCM motor during the $T_{ON}$ and $T_{OFF}$ phases (single snapshot); FIG. 4B shows the voltage across the VCM motor during the $T_{ON}$ and $T_{OFF}$ phases (single snapshot); here again, reference ZV indicates a zero voltage; FIG. 4C shows the trend of the current during the test (namely the trend of the peak current) during the $T_{ON}$ used during the entire test; and FIG. 4D shows the trend of the residual voltage (Vr2($i$)) measured after a constant time t2 starting from the current reset point; FIG. 4D shows the voltage trend and in particular the residual voltage value for each current value, by highlighting the presence a first voltage value VR1' corresponding to a valley (minimum) current and a second voltage value VR2' corresponding to the peak (maximum).

To summarize: FIGS. 3A to 3D show possible time behaviors of electrical signals during a dynamic test where the residual voltage is measured after a first (constant) time t1 starting from the beginning of the $T_{OFF}$ interval, and FIGS. 4A to 4D represent possible time behaviors of electrical signals of interest during a dynamic test where the residual voltage is measured after second (constant) time t2 that starts not from the beginning of the $T_{OFF}$ interval but rather from a current zero point.

Comparing FIGS. 3A to 3D, on the one hand, with FIGS. 4A to 4D, on the other hand (and primarily the comparison of FIGS. 3D and 4D) shows that a residual voltage is present in both instances and that, in both instances, the trend is non-linear as the current used during the excitation phase varies.

One may otherwise note that the non-linearities in the residual voltages between the values VR1, VR2 in FIG. 3D and between the values VR1' and VR2' in FIG. 4D have different characteristics that can be exploited in linearizing of the residual voltage.

FIGS. 5A and 5B illustrate examples of linearization that can be implemented in embodiments of the present description.

Specifically, FIG. 5A shows, a possible trend of the current $I_M$; and

FIG. 5B shows, with reference to the diagrams in FIG. 5A, the trend of the two residual voltages Vr1($i$)—see FIG. 3D—and Vr2($i$)—see FIG. 4D-obtained by sampling the residual voltage at the two instants described above, namely: after a time t1 related to the start of the $T_{OFF}$ interval, and after a time t2 related to the current zeroing point.

A simple mathematical average operation [Vr1($i$)+Vr2($i$)]/2 facilitates computing a third residual voltage Vr3($i$) that is found to approximate closely a linear characteristic as per the ideal (desired) behavior represented by the dotted line "Linear Vr(i)" in FIG. 3D.

This linearization (average) facilitates compensating the residual voltage and extrapolating the actual speed of the VCM motor driven in a discontinuous mode, even using very short $T_{OFF}$ times. As noted, this is advantageous in terms of accuracy of VCM motor speed estimate and as regards the average driving current (that is, the torque generated by the motor).

Figure 6:
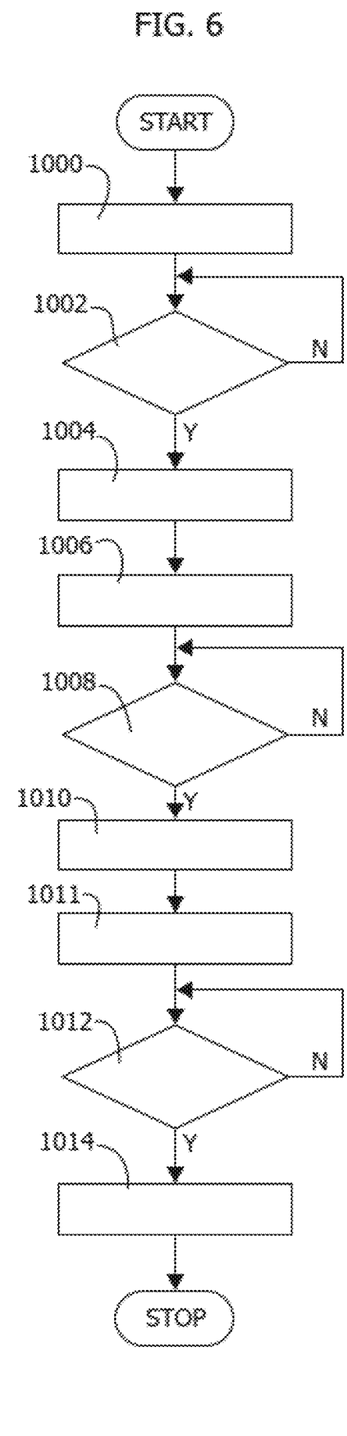
FIG. 6 is a flow chart exemplary of calibration based on the measurement of residual voltages at different instants S1 and S2.

Performing a double measurement of the voltage across the VCM motor, as discussed previously, facilitates calculating the BEMF based on a relationship such as:

$$BEMF = [(v1 + v2)/2] - ResidualVoltage(i)$$

where v1 and v2 are the two measured voltages discussed in the foregoing to which a calibration factor ResidualVoltage(i)=i/imax*(Vr1imax+Vr2imax)/2 can be advantageously applied based on two (residual) voltages Vr1imax and Vr2imax that can be derived in an initial calibration phase as represented by the flow-chart of FIG. 6 discussed in the following.

Referring to the factor ResidualVoltage(i) as a calibration factor that can be advantageously applied to calculate the BEMF is intended to highlight the fact that solutions, as discussed so far involve operating a voice coil motor, VCM 120 in a hard disk drive HDD in a discontinuous mode comprising an alternation of on-times $T_{ON}$ and off-times $T_{OFF}$ wherein supply of the drive current $I_M$ to the VCM 120 is facilitated and countered, respectively, so that a variable current with an instantaneous value i flows through the VCM. A variable VCM voltage is thus developed across the VCM 120 during the on-times $T_{ON}$ and off-times $T_{OFF}$. The intensity of the drive current applied to the VCM is controlled as a function of a Back ElectroMotive Force, BEMF of the VCM 120 (speed control).

A possible basic implementation of solutions as discussed so far sampling during the alternation of on-times $T_{ON}$ and off-times $T_{OFF}$: a first value v1 of the voltage across the VCM that is sampled at a first time t1 in response to the end of the off-time $T_{OFF}$, and a second value v2 of the voltage across the VCM that is sampled at a second time t2 (different from t1) in response to the drive current of the VCM zeroing (that is, becoming zero or substantially zero) following supply of drive current to the VCM being countered (in the $T_{OFF}$ time).

In a possible basic implementation of solutions discussed so far, the BEMF of the VCM 120 is calculated as a function of the first value v1 and the second value v2.

Optionally (see the formula reported above), the BEMF of the VCM 120 is calculated as a function of the average (v1+v2)/2 of the first value v1 and the second value v2.

Advantageously, as exemplified herein, the BEMF of the VCM 120 is calculated as a function of the first value v1 and the second value v2 by applying thereto a calibration factor ResidualVoltage(i) involving the voltages Vr1imax and Vr2imax measured in after a time t1 at the end of the $T_{OFF}$ phase and after a time t2 starting from zeroing of the current i and imax is a current selected (optionally) as the maximum current (see also $I_M$ discussed previously) admitted during discontinuous driving as evidenced by the points where VR2 and VR2' are sampled in FIG. 3D and FIG. 4D.

It is noted that sampling the voltages VR2 and VR2 at the maximum current is not mandatory; hence, the wording is "optional." Any current value higher than zero can be used to reconstruct the equation of the straight line (Linear Vr(i)) passing through the origin.

FIG. 6 is a flow chart exemplary of possible calibration based on the measurement of (at least) two residual voltages carried out at different times t1 (from the end of the time $T_{ON}$) and t2 (from zeroing of the current).

The two voltages (Vr1imax and Vr2imax) and the current used for their generation (imax) can be stored and subsequently retrieved (in a controller such as MCU, for instance) to be used during discontinuous driving of the VCM.

The blocks in the flow-chart of FIG. 6 indicate (after START) the following steps:
1000: set $T_{ON}$ at a, (optionally) maximum current; 1002: check if such a (calibration) on-time $T_{ON}$ ended; if not (CHECK 1002=N), return upstream; 1004: in response to the calibration on-time $T_{ON}$ ended (CHECK 1002=Y) measure (and store) current imax; 1006: start an off-time $T_{OFF}$ after the calibration on-time $T_{ON}$ and start a counter deputy to measure the time t1; 1008: check if flyback current ended (current=0); if not (CHECK 1008=N), return upstream; 1010: in response to flyback current ended (CHECK 1008=Y), start a counter deputy to measure the time t2; 1011: sample (and store) ADC value for Vr2imax after a time t2; 1012: check if the off-time $T_{OFF}$ ended (t1 elapsed); if not (CHECK 1012=N), return upstream; 1014: in response to the off-time $T_{OFF}$ ended (t1 elapsed) (CHECK 1012=Y) measure (and store) sample (and store) ADC value for Vr1imax and then proceed to STOP.

It is noted that the two sampling events can be simultaneous.

For instance (and just by example), the two sampling events coincide if current recirculation at the maximum current lasts 100 μs with t2=20 μs and t1=120 μs.

This case underlies the representation in FIG. 5B. There, a point exists (at a maximum current) where the two voltages coincide: this is possible because the two sampling events take place at the same instant in time As discussed in the introductory portion of this description, VCM speed control in a continuous mode cannot be resorted to in those circumstances where accurate calibration over a non-negligible time duration is required to consider variations of the motor resistance $R_M$ with temperature. As noted, this may be feasible with load and unload phases controlled under normal operating conditions but cannot be carried out satisfactorily in the case of an emergency retract.

As discussed, discontinuous driving can be applied in the event of an emergency retract with the BEMF of the VCM motor measured directly at the motor terminals, without any lengthy calibration involved: calibration, as exemplified in the flow chart of FIG. 6, can be advantageously performed once for good to obtain the parameters included in the calibration factor ResidualVoltage(i) that, for instance, do not exhibit appreciable variations with temperature.

In other words, the two voltages sampled at the instants S1 and S2 (as shown in FIGS. 3B and 4B) change with temperature, but their variations mutually compensate so that their average value is set to be corrected with the value found during calibration with the formula indicated above. This does not apply to calibration according to the prior art.

Figure 7A:
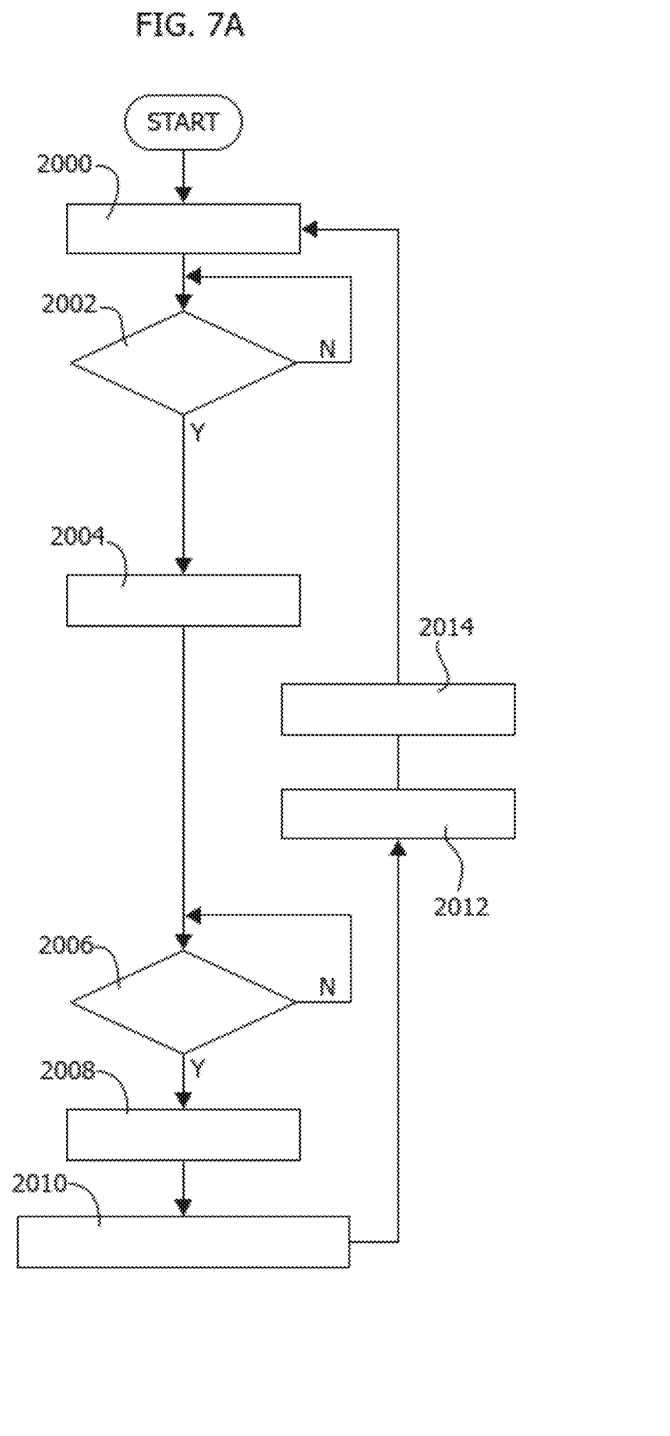
FIGS. 7A and 7B are comparative flow charts describing the speed control of a VCM motor during discontinuous driving in a conventional arrangement (FIG. 7A) and according to embodiments of the present description (FIG. 7B)
Figure 7B:
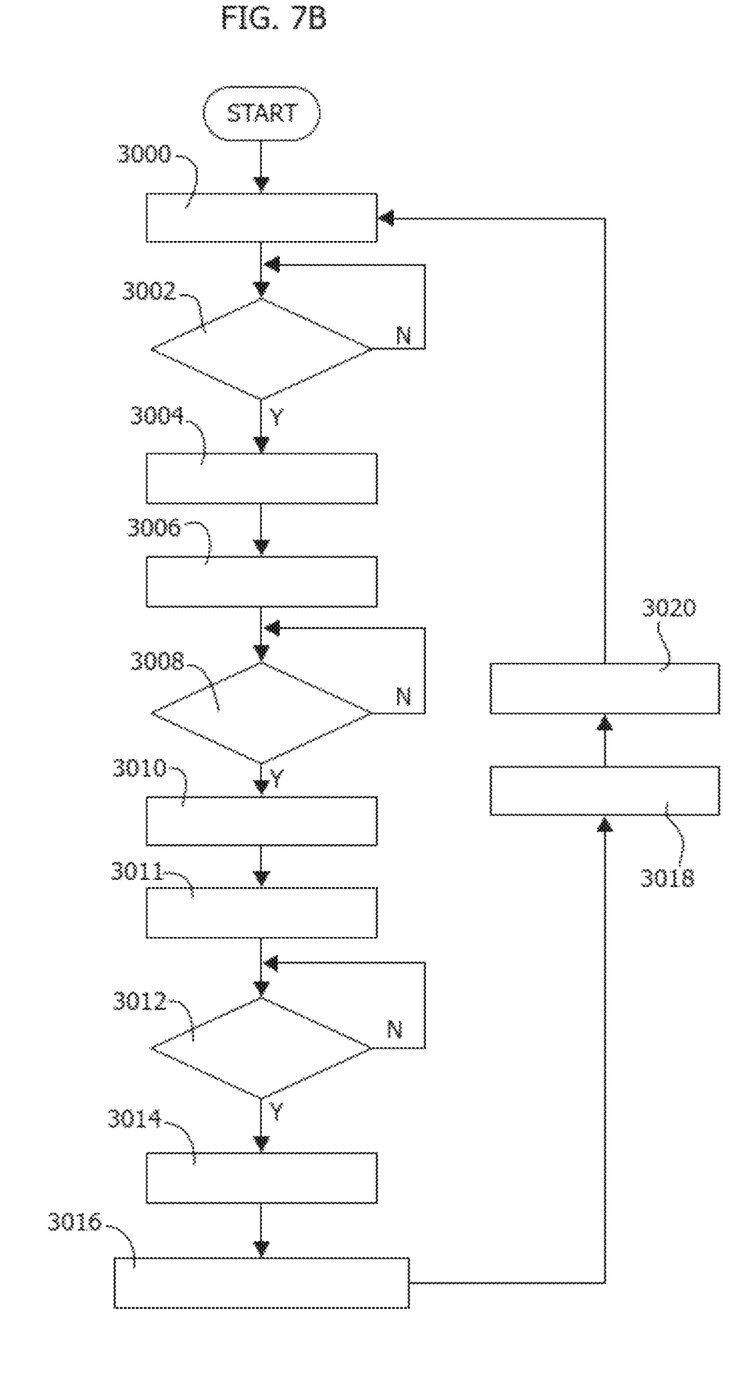

By way of further explanation, FIGS. 7A and 7B are flow charts exemplary of the speed control of a VCM motor during discontinuous driving according to the prior art (FIG. 7A) and according to embodiments of the present description (FIG. 7B).

The blocks in the flow-chart of FIG. 7A indicate (after START) the following steps: 2000: set an on-time $T_{ON}$ with a certain voltage amplitude: the peak current depends on the duration of $T_{ON}$ as well as on the amplitude of the voltage used during $T_{ON}$, with the current varied (optionally) by modulating the voltage rather than the duration of $T_{ON}$; 2002: check if the on-time $T_{ON}$ ended; if not (CHECK 2002=N), return upstream; 2004: in response to the on-time $T_{ON}$ ended (CHECK 2002=Y), start an off-time $T_{OFF}$; 2006: check if the off-time $T_{OFF}$ ended (this is equivalent to t1 as shown in FIG. 3B); if not (CHECK 2006=N), return upstream; 2008: in response to the off-time $T_{OFF}$ ended (CHECK 2006=Y) sample ADC value; 2010: take ADC value as value for BEMF; 2012: supply value for BEMF to speed control loop; and 2014: update VCM current and return to block 2000.

The flowchart of FIG. 7B is exemplary of a speed estimate obtained (based on the BEMF) by calculation using the instantaneous voltages v1, v2 (the average thereof, for instance) measured during sampling plus the calibration voltages Vr1imax, Vr2imax obtained (and stored) during calibration, as well as the measured intensity of the (instantaneous) current I and the maximum value imax obtained (and stored) during calibration.

The blocks in the flow-chart of FIG. 7B indicate (after START) the following steps: 3000: set a first on-time $T_{ON}$ with a certain voltage amplitude; as noted, the peak current depends on the duration of $T_{ON}$ as well as on the amplitude of the voltage used during $T_{ON}$, with the current varied (optionally) by modulating the voltage rather than the duration of $T_{ON}$; 3002: check if the on-time $T_{ON}$ ended; if not (CHECK 3002=N), return upstream; 3004: in response to the on-time $T_{ON}$ ended (CHECK 3002=Y) measure the peak current "i" reached at the end of the time $T_{ON}$; this value is useful in computing the residual voltage based on the relationship ResidualVoltage(i)=i/imax*(Vr1imax+Vr2imax)/2; 3006: start an off-time $T_{OFF}$ and start a counter deputy to measure the time t1 (Toff duration); 3008: check if flyback current ended (current=0); if not (CHECK 3008=N), return upstream; 3010: in response to flyback current ended (CHECK 3008=Y), start a counter deputy to measure the time t2; 3011: after a time t2 is elapsed sample the ADC value for voltage v2 for calculating BEMF; 3012: check if the off-time $T_{OFF}$ ended (t1 elapsed); if not (CHECK 3012=N), return upstream; 3014: in response to the off-time $T_{OFF}$ ended (t1 elapsed) (CHECK 3012=Y) sample ADC value for voltage v1 for calculating BEMF; 3016: calculate BEMF as [(v1+v2)/2]-ResidualVoltage(i), where ResidualVoltage(i)=i/imax*(Vr1imax+Vr2imax)/2 (by retrieving values involved therein as sampled and stored during the calibration phase exemplified by the flow-chart of FIG. 6); 3018: supply value for BEMF to speed control loop; and 3020: update VCM current and return to block 3000.

It will be appreciated that the sampling step 3011 of the ADC value for v2 is illustrated as taking place (at time t2) usually before the sampling step 3014 of the ADC value for v1 at time t1). The times t1 and t2 are thus exemplary of times where sampling is performed in response to the end of an off-time $T_{OFF}$ (at time t1, for v1) and in response to the drive current of the VCM zeroing following supply of drive current to the VCM being countered during an off-time $T_{OFF}$ (at time t2 for v2). As noted, the two sampling events may otherwise coincide with a single (typically maximum) current value.

Also, it will be appreciated that the calibration procedure of FIG. 6 (when implemented) and the control procedure of FIG. 7B may share a step (block 1000 in FIG. 6 and block 3000 in FIG. 7B) where a first on-time $T_{ON}$ is asserted wherein the drive current $I_M$ to the VCM 120 reaches block 1004 in FIG. 6 and block 3004 in FIG. 7B) a peak value (imax in FIG. 6 and i in FIG. 7B) at the end of such the first on-time $T_{ON}$, with the BEMF of the VCM 120 calculated (in block 3016) as a function of the first value v1, the second value v2 and such a peak value, "i" (plus the current value imax, Vr1imax and Vr2imax saved during the calibration shown in FIG. 6).

In the control procedure of FIG. 7B: sampling (in block 3011) of the second value v2 of the voltage across the VCM 120 occurs at time t2 in response to the drive current of the VCM 120 zeroing following supply of drive current to the VCM 120 being countered during an off-time $T_{OFF}$ alternating with such a first on-time $T_{ON}$, and sampling (in block 3014) of the first value (v1) of the voltage across the VCM 120 at time t1 occurs in response to the end (checked in block 3012) of such an off-time (corresponding to the time t1) $T_{OFF}$ alternating with the first on-time $T_{ON}$.

In the calibration procedure of FIG. 6: a first (calibration) on-time $T_{ON}$ is asserted (in block 1000) wherein the drive current to the VCM 120 reaches (in block 1004) a peak value, imax at the end of such a calibration on-time $T_{ON}$, a calibration value Vr2imax of the second value of the voltage across the VCM 120 is sampled and stored (in block 1011) in response to the drive current of the VCM 120 zeroing starting from that peak value, imax in response to the supply of drive current to the VCM 120 being countered during a calibration off-time $T_{OFF}$ alternating with the calibration on-time $T_{ON}$, and a calibration value Vr1imax of the first value of the voltage across the VCM 120 is sampled and stored (in block 1014) in response to the end (checked in block 1012) of the calibration off-time $T_{OFF}$ alternating with the calibration on-time $T_{ON}$.

The BEMF of the VCM 120 can thus be calculated (in block 3016) as a function of the first value v1, the second value v2, the current peak value "i," the calibration values Vr1imax, Vr2imax and imax.

Figure 8:
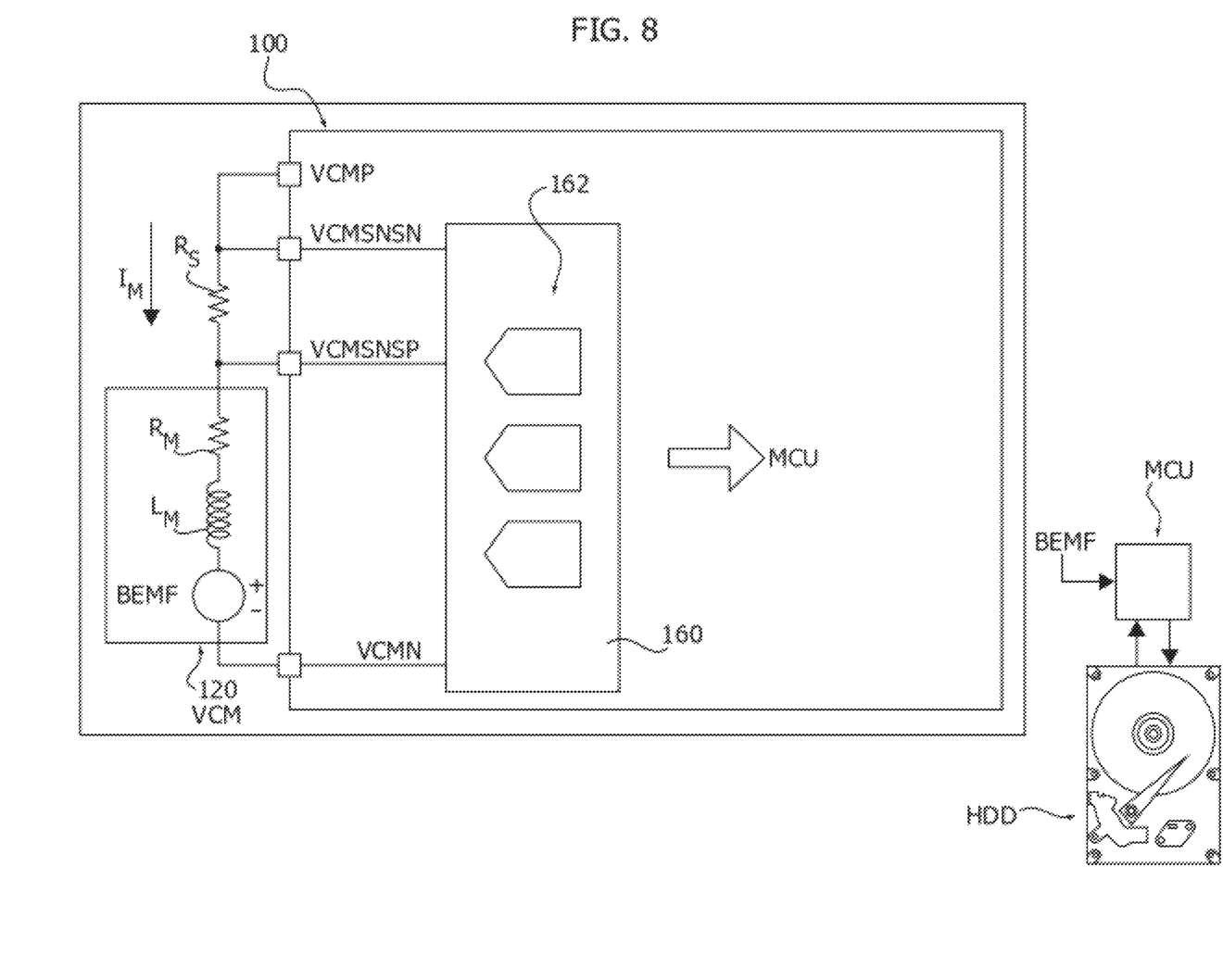
FIG. 8 illustrates an embodiment circuit.

Processing exemplified in the flow charts of FIG. 6 (calibration) and FIG. 7B (VCM speed estimate and VCM current control) can be implemented (in a manner known per se to those of skill in the art) in circuit arrangement as illustrated in FIG. 8 by way of direct comparison with the conventional circuit arrangement illustrated in FIG. 1.

In FIG. 8, reference 160 indicates processing circuitry, including analog-to-digital converters, collectively indicated as 162, configured to convert to digital the signal sensed between the input nodes VCMSNSN and VCMSNSP (voltage across the "amperometry" resistor $R_S$, indicative of the VCM current $I_M$) and the signal sensed between the input nodes VCMSNSP and VCMN (voltage across the VCM motor). The processing circuitry 160 is configured to control (update) the VCM current in a closed-loop arrangement.

This closed-loop control may take place in any conventional way known to those of skill in the art for that purpose, which makes it unnecessary to provide a more detailed description herein.

As noted, embodiments of the present description are primarily concerned with adequately evaluating (measuring) the BEMF of a VCM rather than with the solutions that may be adopted for controlling a VCM based on such an adequate evaluation/measurement of the BEMF.

In that respect, those of skill in the art will appreciate that, while represented as separate entities for clarity and ease of understanding: a circuit such as circuit 160 in FIG. 8 may be at least partly incorporated in the controller MCU, with such a controller provided the processing resources involved in calculating the BEMF of the VCM as discussed previously, and/or the controller MCU may be at least partly incorporated (hosted) in the HDD.

Without prejudice to the underlying principles, the details and embodiments may vary, even significantly, with respect to what has been described in the foregoing, by way of example only, without departing from the extent of protection.

The extent of protection is determined by the annexed claims.

What is claimed is:

1. A method to operate a voice coil motor (VCM) in a hard disk drive (HDD), the method comprising:
   sampling a first value of a voltage across the VCM at a first time corresponding to an end of an OFF time of the HDD alternating between ON and OFF times;
   sampling a second value of the voltage across the VCM at a second time corresponding to a drive current of the VCM zeroing following supply of drive current to the VCM being countered during the OFF time, the drive current supplied to the VCM being facilitated and countered, respectively, with a variable voltage across the VCM during the ON and OFF times, an intensity of the drive current controlled as a function of a Back ElectroMotive Force (BEMF) of the VCM; and
   calculating the BEMF of the VCM as a function of the first value and the second value.

2. The method of claim 1, further comprising calculating the BEMF of the VCM as a function of an average of the first value and the second value.

3. The method of claim 1, further comprising:
   asserting a first ON time of the alternating ON and OFF times, wherein the drive current to the VCM reaches a peak value in response to the end of the first ON time; and
   calculating the BEMF as a function of the first value, the second value, and the peak value.

4. The method of claim 3, wherein the sampling the second value of the voltage across the VCM at the second time corresponding to the drive current of the VCM zeroing following supply of drive current to the VCM being countered during the OFF time comprises the OFF time alternating with the first ON time, and wherein the sampling the first value of the voltage across the VCM at the first time corresponds to an end of the OFF time comprises the OFF time alternating with the first ON time.

5. The method of claim 3, further comprising:
   asserting a calibration ON time, wherein the drive current reaches the peak value in response to the end of the calibration ON time;
   sampling and storing a second calibration value of the second value in response to the drive current of the VCM zeroing from the peak value in response to the supply of drive current to the VCM being countered during a calibration OFF time that alternates with the calibration ON time;
   sampling and storing a first calibration value of the first value in response to the end of the calibration OFF time; and
   calculating the BEMF of the VCM as a function of the first value, the second value, the intensity of the drive current, the first calibration value, and the second calibration value.

6. The method of claim 5, where the BEMF is calculated in accordance with the equation:

$$\left[\left(\frac{V_1 + V_2}{2}\right) - \frac{i}{i_{max}} \times \frac{V_{r1,imax} + V_{r2,imax}}{2}\right],$$

where $V_1$ is the first value, $V_2$ is the second value, $i$ is the intensity of the drive current, $i_{max}$ is the peak value of the drive current to the VCM measured during calibration, $V_{r1,imax}$ is the first calibration value, and $V_{r2,imax}$ is the second calibration value.

7. The method of claim 1, wherein the HDD is operating in discontinuous mode.

8. A control circuit configured to operate a voice coil motor (VCM) in a hard disk drive (HDD), the control circuit comprising:
   sampling circuitry couplable to the VCM, the sampling circuitry configured to:
      sample a first value of a voltage across the VCM at a first time corresponding to an end of an OFF time of the HDD alternating between ON and OFF times,
      sample a second value of the voltage across the VCM at a second time corresponding to a drive current of the VCM zeroing following supply of drive current to the VCM being countered during the OFF time, the drive current supplied to the VCM being facilitated and countered, respectively, with a variable voltage across the VCM during the ON and OFF times; and
   processing circuitry configured to:
      calculate a Back ElectroMotive Force (BEMF) of the VCM as a function of the first value and the second value, and
      control an intensity of the drive current applied to the VCM as a function of the calculated BEMF.

9. The control circuit of claim 8, wherein the processing circuitry is configured to calculate the BEMF of the VCM as a function of an average of the first value and the second value.

10. The control circuit of claim 8, wherein the sampling circuitry is configured to assert a first ON time of the alternating ON and OFF times, wherein the drive current to the VCM reaches a peak value in response to the end of the first ON time, and wherein the processing circuitry is configured to calculate the BEMF as a function of the first value, the second value, and the peak value.

11. The control circuit of claim 10, wherein the sampling the second value of the voltage across the VCM at the second time corresponding to the drive current of the VCM zeroing following supply of drive current to the VCM being countered during the OFF time comprises the OFF time alternating with the first ON time, and wherein the sampling the first value of the voltage across the VCM at the first time corresponds to an end of the OFF time comprises the OFF time alternating with the first ON time.

12. The control circuit of claim 10,
   wherein the sampling circuitry is configured to:
      assert a calibration ON time, wherein the drive current reaches the peak value in response to the end of the calibration ON time,
      sample and store a second calibration value of the second value in response to the drive current of the VCM zeroing from the peak value in response to the supply of drive current to the VCM being countered during a calibration OFF time that alternates with the calibration ON time, and
      sample and store a first calibration value of the first value in response to the end of the calibration OFF time, and wherein the processing circuitry is configured to calculate the BEMF of the VCM as a function of the first value, the second value, the intensity of the drive current, the first calibration value, and the second calibration value.

13. The control circuit of claim 12, where the BEMF is calculated in accordance with the equation:

$$\left[\left(\frac{V_1+V_2}{2}\right)-\frac{i}{i_{max}}\times\frac{V_{r1,imax}+V_{r2,imax}}{2}\right],$$

where $V_1$ is the first value, $V_2$ is the second value, i is the intensity of the drive current, $i_{max}$ is the peak value of the drive current to the VCM measured during calibration, $V_{r1,imax}$ is the first calibration value, and $V_{r2,imax}$ is the second calibration value.

14. The control circuit of claim 8, wherein the HDD is operating in discontinuous mode.

15. A hard disk drive (HDD), comprising:
a voice coil motor (VCM); and
a control circuit configured to operate the VCM, the control circuit comprising:
sampling circuitry couplable to the VCM, the sampling circuitry configured to:
sample a first value of a voltage across the VCM at a first time corresponding to an end of an OFF time of the HDD alternating between ON and OFF times,
sample a second value of the voltage across the VCM at a second time corresponding to a drive current of the VCM zeroing following supply of drive current to the VCM being countered during the OFF time, the drive current supplied to the VCM being facilitated and countered, respectively, with a variable voltage across the VCM during the ON and OFF times; and
processing circuitry configured to:
calculate a Back ElectroMotive Force (BEMF) of the VCM as a function of the first value and the second value, and
control an intensity of the drive current applied to the VCM as a function of the calculated BEMF.

16. The HDD of claim 15, wherein the processing circuitry is configured to calculate the BEMF of the VCM as a function of an average of the first value and the second value.

17. The HDD of claim 15, wherein the sampling circuitry is configured to assert a first ON time of the alternating ON and OFF times, wherein the drive current to the VCM reaches a peak value in response to the end of the first ON time, and wherein the processing circuitry is configured to calculate the BEMF as a function of the first value, the second value, and the peak value.

18. The HDD of claim 17,
wherein the sampling circuitry is configured to:
assert a calibration ON time, wherein the drive current reaches the peak value in response to the end of the calibration ON time,
sample and store a second calibration value of the second value in response to the drive current of the VCM zeroing from the peak value in response to the supply of drive current to the VCM being countered during a calibration OFF time that alternates with the calibration ON time, and
sample and store a first calibration value of the first value in response to the end of the calibration OFF time, and
wherein the processing circuitry is configured to calculate the BEMF of the VCM as a function of the first value, the second value, the intensity of the drive current, the first calibration value, and the second calibration value.

19. The HDD of claim 18, where the BEMF is calculated in accordance with the equation:

$$\left[\left(\frac{V_1+V_2}{2}\right)-\frac{i}{i_{max}}\times\frac{V_{r1,imax}+V_{r2,imax}}{2}\right],$$

where $V_1$ is the first value, $V_2$ is the second value, i is the intensity of the drive current, $i_{max}$ is the peak value of the drive current to the VCM measured during calibration, $V_{r1,imax}$ is the first calibration value, and $V_{r2,imax}$ is the second calibration value.

20. The HDD of claim 15, wherein the HDD is couplable to a processing device, the HDD configured to store signals to be executed by the processing device.

* * * * *